(12) United States Patent
Sairo et al.

(10) Patent No.: US 7,440,983 B2
(45) Date of Patent: Oct. 21, 2008

(54) VELOCITY ADJUSTMENT IN LEARNING CELL IDENTITY

(75) Inventors: Hanna Sairo, Tampere (FI); Jani Käppi, Tampere (FI); Paula Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 313 days.

(21) Appl. No.: 11/010,063

(22) Filed: Dec. 10, 2004

(65) Prior Publication Data

US 2006/0129607 A1    Jun. 15, 2006

(51) Int. Cl.
G06F 12/00 (2006.01)
G06F 17/30 (2006.01)
H04Q 7/20 (2006.01)
(52) U.S. Cl. .................... 707/204; 455/456.1
(58) Field of Classification Search .............. 707/1, 707/2, 6, 7, 204, 200; 455/456.1–456.6
See application file for complete search history.

(56) References Cited

U.S. PATENT DOCUMENTS

| | | | | |
|---|---|---|---|---|
| 6,064,339 A | * | 5/2000 | Wax et al. | 342/417 |
| 6,985,745 B2 | * | 1/2006 | Quaid | 455/456.2 |
| 2003/0146871 A1 | * | 8/2003 | Karr et al. | 342/457 |
| 2004/0198386 A1 | * | 10/2004 | Dupray | 455/456.1 |

* cited by examiner

Primary Examiner—Hung T Vy (57) ABSTRACT

A method for updating a data base which includes positioning data and identity information of a cell, the method comprising receiving a position of a device and receiving identity information of a cell. The data base is examined to find parameter information relating to the received identity information. The parameter information is retrieved from the data base. It is determined whether the data base is to be updated with the position data of the device, wherein if it is determined that the data base is to be updated, the updating of the data base is performed by using the position data of the device and the value of an updating parameter is updated.

41 Claims, 6 Drawing Sheets

VELOCITY ADJUSTMENT IN LEARNING CELL IDENTITY

FIELD OF THE INVENTION

The present invention relates to a method for updating a data base which includes positioning data and identity information of a base station. The invention further relates to a module, a wireless communication device, a system and a computer program product.

BACKGROUND OF THE INVENTION

In positioning systems based on satellite positioning, a positioning receiver attempts to receive signals of at least four satellites in order to detect the position of the positioning receiver and the time data. An example of such a satellite positioning system is the GPS system (Global Positioning System) comprising a plurality of satellites orbiting the globe according to predefined orbits. These satellites transmit positioning data, on based of which the position of a satellite can be defined at each moment of time, in case the exact time data used in the satellite positioning system is known in the positioning receiver. In the GPS system, the satellites transmit a spread spectrum signal which is modulated with a code that is individual for each satellite. Thus, the positioning receiver can distinguish signals transmitted by different satellites from each other by using a reference code corresponding to the satellite code generated locally in the positioning receiver.

A drawback with such positioning systems based on satellite positioning is often the fact that a signal transmitted by a satellite is strongly attenuated when arriving to the positioning receiver, wherein it is very difficult to distinguish the signal from the background noise. The signal can be attenuated inter alia due to climatic conditions and obstacles, such as buildings and surrounding grounds in the routing of the signal. Also, the signal can wander to the positioning receiver through a plurality of different routes which causes so-called multipath propagation and aggravates the synchronizing of the positioning receiver to a wished signal because the transmitted signal arrives to the receiver through different routings, for example straight from the satellite (line-of-sight) and, in addition to this; reflected. Due to this multipath propagation the same signal is received as a plurality of signals with different phases. It is particularly difficult to perform positioning inside a building, because a building itself strongly attenuates the signal transmitted by satellites and, on the other hand, multipath propagation can be even stronger since possibly reflected signals coming for example through a window are not necessarily as attenuated as signals coming straight through the roof. In this case, the receiver can make erroneous interpretations about the time of flight and the positioning of the satellite during the moment of transmission, inter alia due to said increase in the signal time-of-flight caused by multipath propagation In the mobile communication network MN (FIG. 1) every cell has an individual identifier CGI (Cell Global Identity). For example in the GSM system the cell global identity CGI usually comprises the following four parts:

mobile country code MCC,
mobile network code MNC,
location area code LAC, and
cell identity CI.

When the base station BS, BS', BS" has an omnidirectional antenna the coverage area of the base station constitutes one cell. However, base stations BS, BS', BS" in which directional antennas are used each sector of the directional antenna can define one cell. Thus, the base station BS, BS', BS" may in fact constitute more than one cell and each cell can be identified by the individual identifier CGI of the cell.

Thus, every cell can be identified on the basis of the cell global identity CGI of this cell. The serving cell, that is the cell of the base station BS, BS', BS" through which the wireless communication device MS communicates with the mobile communication network MN at a time, transmits to the mobile communication device the cell global identity CGI of the serving cell. The cell global identity can be transmitted, for example, via a control channel of the mobile communication network MN. Thus, inter alia in connection with a cell handover the wireless communication device MN can detect the cell change on the basis of the change in the cell global identity CGI if the cell identity CI is available.

Figure 1:
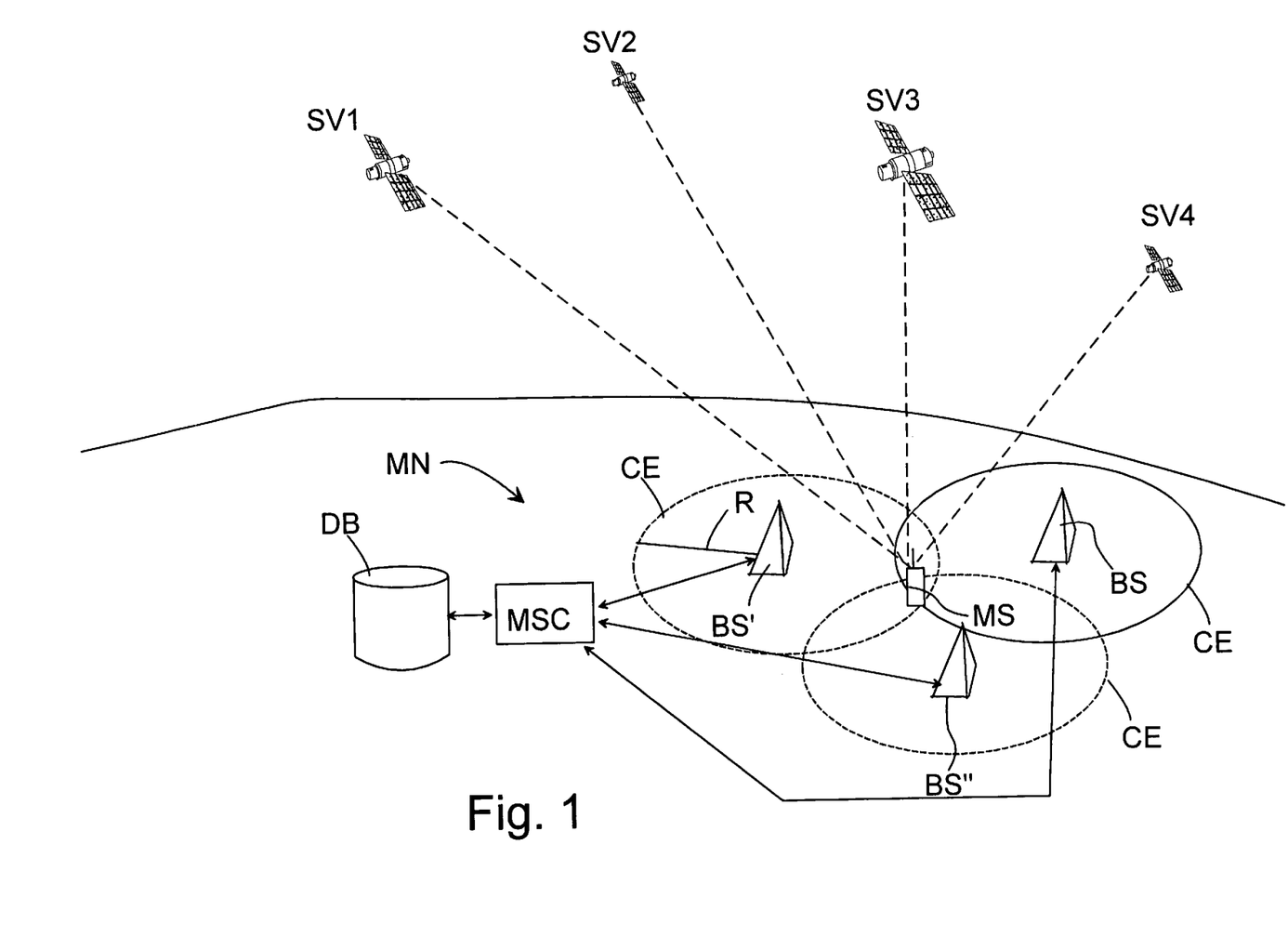
FIG. 1 shows the system according to an example embodiment of the invention in a reduced manner.

In FIG. 1 the cells are depicted as circles CE but it is obvious that in practice the shapes of the cells are not exactly circles. The base station of the cell can be assumed to be located at the center of the cell when the base station constitutes one cell BS, BS', BS". The wireless communication devices which have positioning means such as a GPS receiver attached can send information related to the cell global identity of the serving cell to the base station of the serving cell. For example, the positioning receiver informs the current position to the wireless communication device at intervals, e.g once in every second. The wireless communication device sends the position information and the cell global identity through the base station of the serving cell to a server in which the data base DB is formed. The server can then calculate the radius and the center point of the cell in question by using the positioning information related to the cell and/or to the base station of the cell. The accuracy of the calculation depends inter alia on the number of data pairs i.e. position data and cell global identity and how close or how far each position data are to/from each other. On the other hand, when there are many data pairs for a particular cell a new data pair does not have a great effect to the radius and the center point of the cell. Therefore, if the data base contains lots of data pairs in which the position data does not differ a lot, the calculation result may be significantly distorted. The operator of the server may also require a fee for using the information of the data base.

There does not need to be a separate server for the data base DB but each wireless communication device can form and update a data base of its own. In this alternative the wireless communication devices can use the positioning data from the positioning receiver of the wireless communication device. It is also possible that wireless communication devices exchange positioning data and cell global identity with each other. When the data base is located in the wireless communication device the user does not need to pay any fees for using the data base.

It is also possible that the data base is located in the wireless communication network.

The cell global identity CGI can be utilized to assist the positioning e.g. in the following manner. In the wireless communication device MS the information transmitted by the base station BS, BS', BS" is received, from which information inter alia on the cell global identity CGI or parts of it is found out. According to this identity it is detected whether any information related to the position of this particular cell and/or the base station BS, BS', BS" is stored in the memory of the wireless communication device. If no positioning data in accordance with the cell global identity is found in the memory, the necessary positioning data is searched from the database DB. The database may be located in the wireless communication device, in a network such as a mobile communication network, etc. If the positioning data is stored in the mobile communication network MN, for example in each base station BS, BS', BS", in the mobile switching center MSC, or in the GPRS packet network, the wireless communication device MS transmits to the mobile communication network MN a request to transmit the positioning data of the base station and/or the cell in question to the wireless communication device MS. As a response, the base station transmits the positioning data of the base station and/or the cell and, if necessary, other auxiliary data in accordance with the satellite positioning system as well, such as the orbit parameters and the almanac data of the satellites. The transmitted information is received in the wireless communication device MS, wherein at least the positioning data of the base station and/or the cell is stored in the memory of the wireless communication device MS. In addition, the received parts of the cell global identity CGI of the cell are stored, which can then be used as an index to the positioning data stored into the memory.

The radius R and the center point of the cell can be calculated on the basis of the positioning data related to the cell in question.

After the position of the serving cell and/or base station is known in the wireless communication device MS, it is possible to utilize this positioning data of the cell and/or the base station in the positioning by setting it as the default position of the positioning receiver. According to this positioning data the wireless communication device is informed of the approximate position of the wireless communication device on the globe. On the basis of the time data transmitted by the base station it is possible to estimate in the wireless communication device which satellites are above the horizon, that is, visible as seen from the wireless communication device. Next, the wireless communication device can attempt to search for the signals of these visible satellites. Positioning can thus be performed in a manner known as such by first using this default position and by precisioning the positioning on the basis of the signals received from the satellites SV1 to SV4.

The positioning receiver receives information transmitted by satellites and performs positioning on the basis of the received information. For the positioning, the receiver must receive a signal transmitted by at least four different satellites to find out the x, y, z coordinates and the time data. The received navigation information is stored in a memory, wherein this stored information can be used to find out e.g. the positioning data of satellites.

FIG. 1 shows, in a principle diagram, positioning, by means of a signal transmitted from four satellites SV1, SV2, SV3, SV4 in a wireless communication device MS comprising a positioning receiver. In the GPS system, the satellites transmit positioning data as well as time data, on the basis of which the positioning receiver can perform calculations to determine the current position of the satellite. These positioning data and time data are transmitted in frames which are further divided into subframes (not shown). In the GPS system, each frame comprises 1500 bits, which are divided into five subframes of 300 bits each. Since the transmission of one bit takes 20 ms, the transmission of each subframe thus takes 6 s, and the whole frame is transmitted in 30 seconds. The subframes are numbered from 1 to 5. In each subframe 1, e.g. time data is transmitted, indicating the moment of transmission of the subframe as well as information about the deviation of the satellite clock with respect to the time in the GPS system.

The subframes 2 and 3 are used for the transmission of positioning data. The subframe 4 contains other system information, such as universal time, coordinated (UTC). The subframe 5 is intended for the transmission of almanac data of all the satellites. The entity of these subframes and frames is called a GPS navigation message which comprises 25 frames, i.e. 125 subframes. The length of the navigation message is thus 12 min 30 s.

One drawback in prior art systems is that the data of a cell in the data base may be saturated due to numerous amounts of positioning data. This has the effect that new positioning data does not change the calculated parameters (radius, center point) of the cell. For example, if the data base is updated quite often by a wireless communication device using positioning data from a small area, it may have more effect to the calculation result compared with positioning data updated less often and from a larger area by another wireless communication device. For example, if the user of the wireless communication device is walking, the distance between successive position fixes does not change a lot compared with a situation in which the user e.g. drives a car i.e. the traveling speed of the wireless communication device affects to the positioning data of the data base.

SUMMARY OF THE INVENTION

The present invention provides a method and a device for updating a data base which can be used to calculate a default location of a device. The data base is arranged, for example, in a data network, such as the Internet network and/or a mobile communication network. Moreover, the data base or the positioning data of one or a plurality of reference points can be stored into the device comprising a positioning receiver. The invention is based on the idea that the data base is updated by the device so that when the device has new positioning data available the device determines whether the data base will be updated with the new positioning data or not. According to a first aspect of the present invention there is provided a method for updating a data base which includes positioning data and identity information of a cell, the method comprising:

receiving a position of a device;
receiving identity information of a cell;
examining the data base to find parameter information relating to the received identity information;
retrieving from the data base the parameter information; and
determining whether the data base is to be updated with the position data of the device;
wherein if it is determined that the data base is to be updated the method further comprises updating the data base by using the position data of the device and updating the value of an updating parameter.

According to a second aspect of the present invention there is provided a module for updating a data base which includes positioning data and identity information of a base station, the module comprising:

an input for receiving a position of a device;
a receiver for receiving identity information of a cell;
a control element adapted to examine the data base to find parameter information relating to the received identity information; and
a retriever for retrieving the parameter information from the data base;
wherein the control element is further adapted to determine whether the data base is to be updated with the position data of the device; and if it is determined that the data base is to be updated, the control element is adapted to update the data base by using the position data of the device and updating the value of an updating parameter.

According to a third aspect of the present invention there is provided a wireless communication device comprising:
- a positioning receiver for defining a position of the wireless communication device;
- a receiver for receiving identity information of a cell;
- a control element adapted to examine the data base to find parameter information relating to the received identity information; and
- a retriever for retrieving the parameter information from a data base which includes positioning data and identity information of a cell;
- wherein the control element is further adapted to determine whether the data base is to be updated with the position data of the wireless communication device; and if it is determined that the data base is to be updated, the control element is adapted to update the data base by using the position data of the wireless communication device and updating the value of an updating parameter.

According to a fourth aspect of the present invention there is provided a system comprising:
- a wireless communication device
- a positioning receiver for defining a position of the wireless communication device;
- a receiver in the wireless communication device for receiving identity information of a cell;
- a control element in the wireless communication device adapted to examine the data base to find parameter information relating to the received identity information; and
- a retriever for retrieving the parameter information from a data base which includes positioning data and identity information of a cell;
- wherein the control element is further adapted to determine whether the data base is to be updated with the position data of the wireless communication device; and if it is determined that the data base is to be updated, the control element is adapted to update the data base by using the position data of the wireless communication device and updating the value of an updating parameter.

According to a fifth aspect of the present invention there is provided a computer program product comprising machine executable steps stored on a readable medium for execution on a processor, wherein the machine executable steps are for updating a data base which includes positioning data and identity information of a cell, the computer program product further comprising machine executable steps for:
- receiving a position of a device;
- receiving identity information of a cell;
- examining the data base to find parameter information relating to the received identity information;
- retrieving from the data base the parameter information; and
- determining whether the data base is to be updated with the position data of the device;
- wherein if it is determined that the data base is to be updated the computer program product further comprises machine executable steps for updating the data base by using the position data of the device and updating the value of an updating parameter.

The present invention provides advantages when compared to the positioning methods and devices of prior art. The method provides a way to create and update the data base which can be used by mobile devices for determining the position of the mobile device. Usage of the present invention in updating the data base can result to a cell model which is more realistic compared to prior art cell models. In the present invention the traveling speed of the device can be taken into consideration so that when the device is moving slowly the data base is updated less often compared to a situation when the device is moving faster. This arrangement reduces the risk that the data base get saturated (i.e. new position data does not have any effect on the calculated range and center point of the cell).

DESCRIPTION OF THE DRAWINGS

In the following, the present invention will be described in more detail with reference to the appended drawings, in which.

DETAILED DESCRIPTION OF THE INVENTION

In the following, the operation of the method according to a first example embodiment of the invention will be described with reference to the system shown in FIG. 1. An electronic device performing positioning is in FIG. 2 exemplified by a wireless communication device MS comprising, in addition to the mobile communication means MT, also a positioning receiver PR. Thus, the mobile communication means MT can be used for transmitting information between the wireless communication device MS and the base stations BS, BS', BS" of the mobile communication network MN.

Figure 6A:
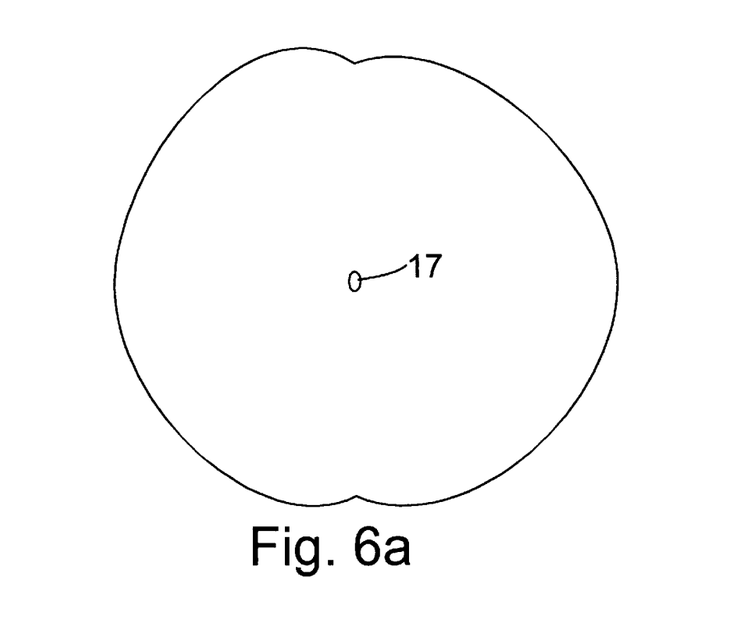
FIGS. 6a and 6b depict examples of radiation patterns of an omnidirectional antenna and a directional antenna respectively.
Figure 6B:
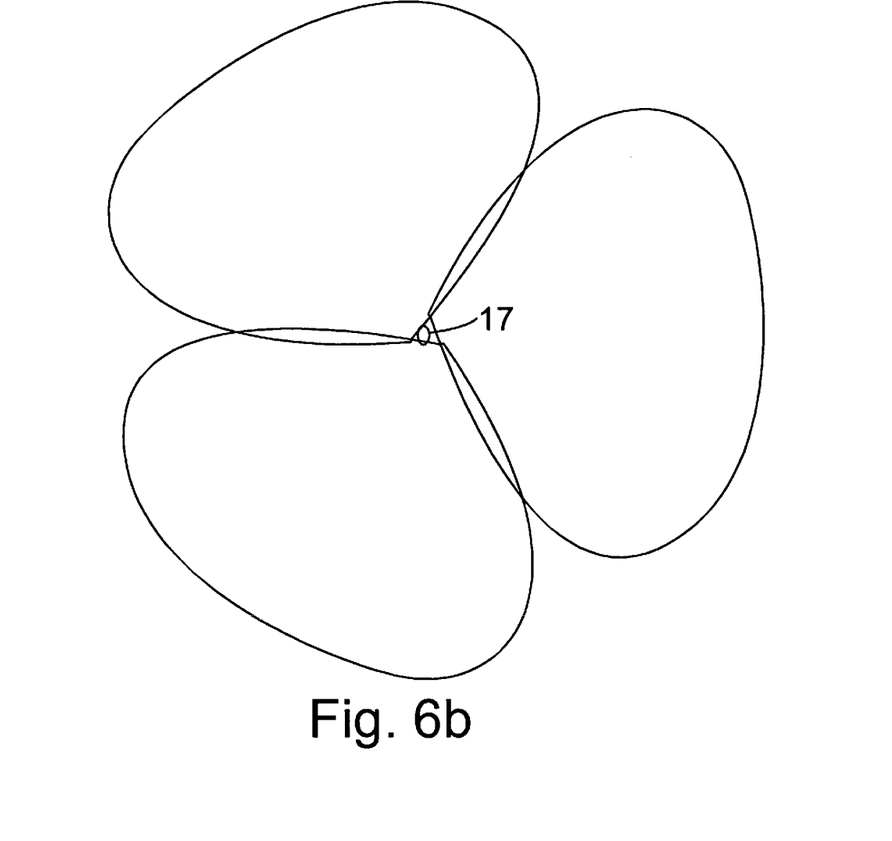

The base station BS, BS', BS" has an antenna 17 (FIGS. 6a, 6b) which can be an omnidirectional antenna or a directional antenna. When an omnidirectional antenna is used at the base station the base station constitutes one cell. Respectively, when a directional antenna is used at the base station the base station constitutes more than one cell, typically one cell for each sector of the directional antenna. The radiation pattern of the antenna 17 at least partly defines the coverage area of the cell. In FIGS. 6a and 6b examples of the radiation patterns of an omnidirectional antenna and a directional antenna are depicted, respectively. When the wireless communication device MS moves from one cell to another cell a handover is performed to change the serving cell for the wireless communication device MS. Thus, it may happen that the base station BS, BS', BS" remains the same although the serving cell changes.

Figure 2:
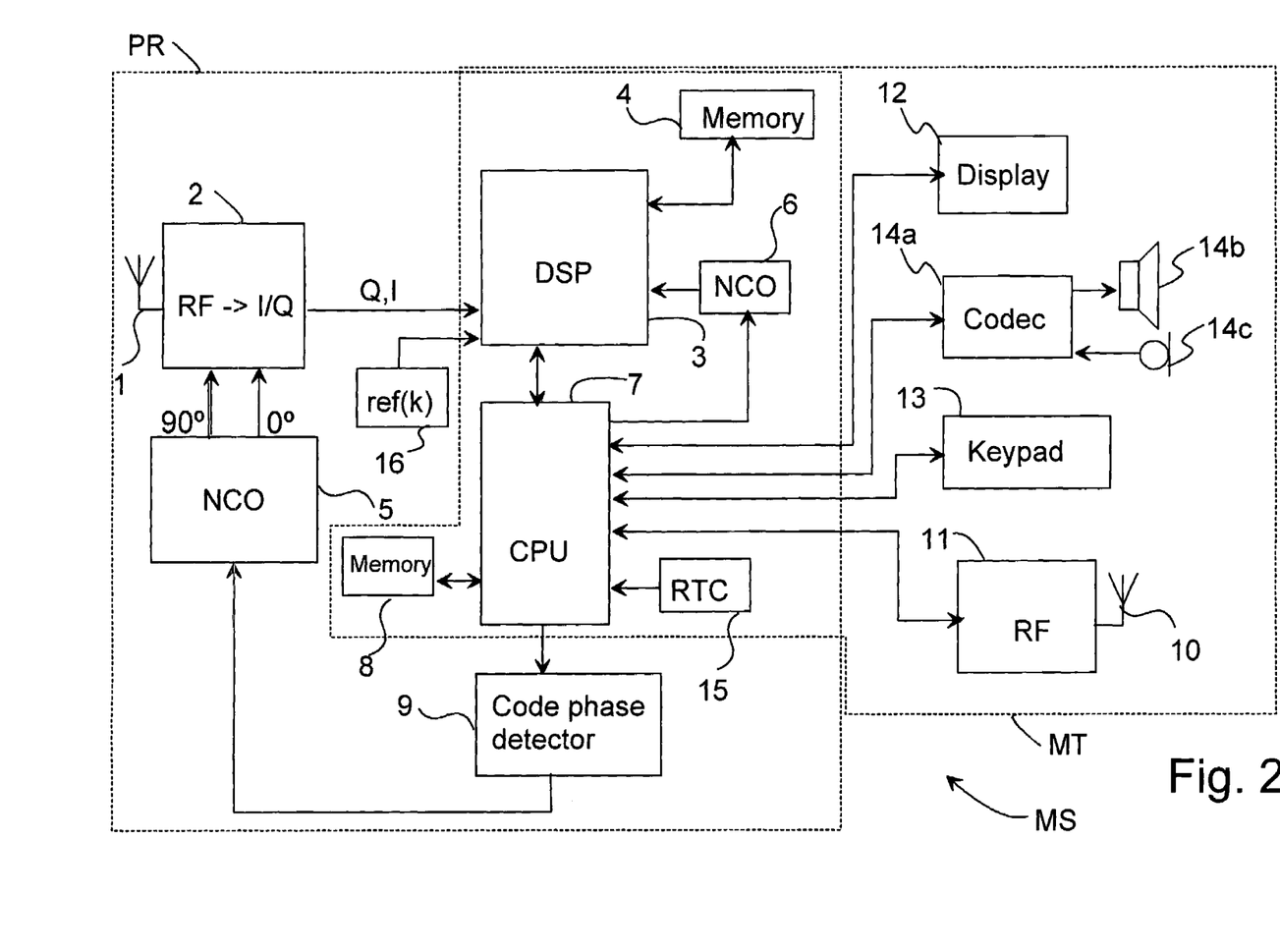
FIG. 2 shows an electronic device according to an example embodiment of the invention in a reduced block diagram.

In a positioning receiver PR according to FIG. 2, a signal to be received via a first antenna 1 is converted preferably to an intermediate frequency in the converter block 2. The signal converted to the intermediate frequency comprises two components known as such: I and Q components, with a phase difference of approximately 90° there-between. These analog signal components converted to the intermediate frequency are digitized. During the digitizing of the signal components, for example at least one sample is taken of each chip, i.e. at least 1,023,000 samples per second are thus taken in the GPS system. Furthermore, the I and Q components of the digitized signal are multiplied by a signal formed by a first numerically controlled oscillator (NCO) 5. The purpose of the signal of this first numerically controlled oscillator 5 is to correct the frequency deviation caused by the Doppler shift and a frequency error of the local oscillator (not shown) of the receiver. The signals formed in the converter blocks 2 are, for example, led to a digital signal processor 3. Reference codes ref(k) corresponding to the codes used in code modulation of the satellites to be received at a time are generated in block 16. Using e.g. this reference code ref(k), the positioning receiver PR attempts to find the code phase and frequency deviation of the signal of the satellite received on each receiving channel, to be used in the operations after the synchronization.

A control block 7 is used for controlling inter alia a code phase detector 9 which is used for adjusting the frequency of the numerically controlled oscillator 5, if necessary. The synchronization will not be described in more detail in this specification, since it is prior art known per se. If necessary, after the receiving channel has been synchronized to the signal of a satellite SV1, SV2, SV3, SV4, the demodulation and storage of the navigation information transmitted in the signal can be initiated, if possible. The digital signal processor 3 stores navigation information in a memory 4. In the method according to the present invention, it is not necessary to modulate and store this navigation information, but the positioning receiver PR has to define the chip and epoch of the signals received from the satellites.

The wireless communication device MS also comprises mobile communication means MT for performing the functions of the wireless communication device, such as a second antenna 10, a radio part 11, audio means, such as a codec 14a, a speaker 14b and a microphone 14c, a display 12, and a keypad 13. However, it is obvious that a part of the functional blocks of the wireless communication device MS can be common to both the positioning receiver PR and the mobile communication means MT. For example the display 12 and the keypad 13 can be used in some applications also in connection with the positioning receiver PR, for example to show the result of the performed positioning. The control block 7 can also be common both for the control of the positioning receiver PR and the mobile communication means MT, or one or a plurality of individual control blocks can be arranged for both units.

Figure 4:
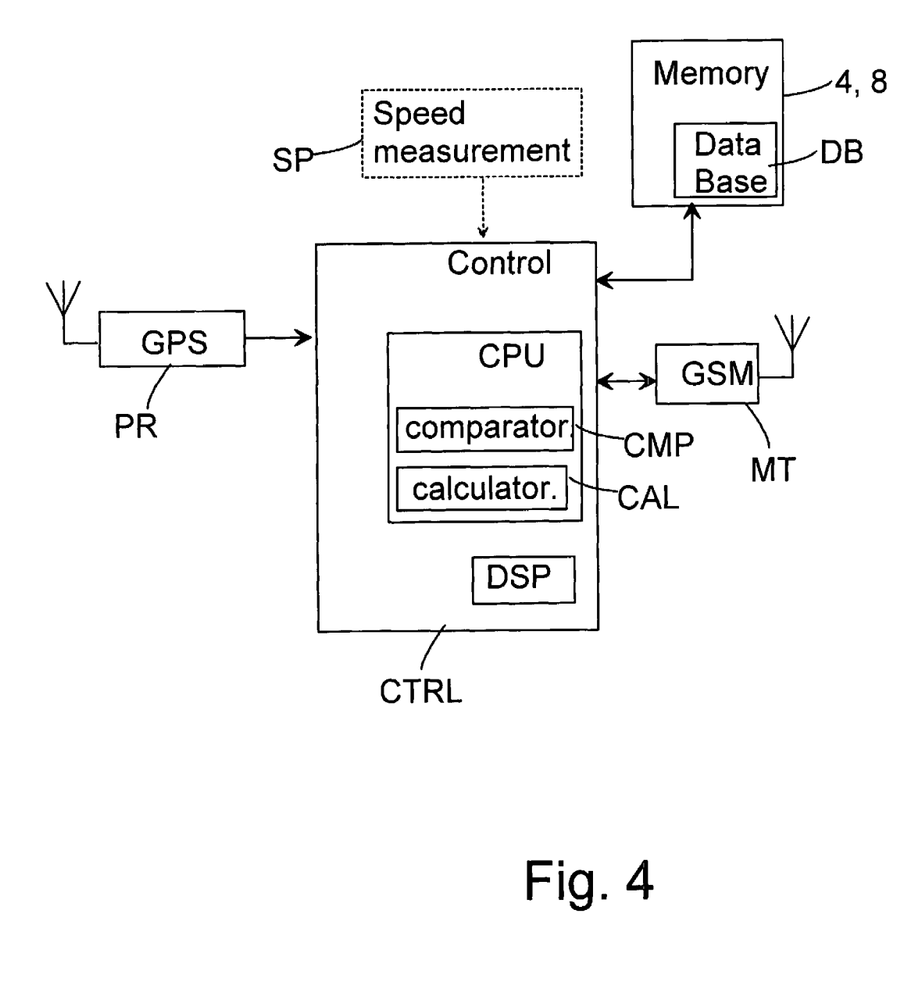
FIG. 4 shows a wireless communication device according to an example embodiment of the invention in a reduced block chart.

In the first example embodiment of the present invention it is assumed that the data base DB is created and updated by the wireless communication device MS. The data base DB is stored in the memory 4, 8 of the wireless communication device MS. This is illustrated in FIG. 4. When the positioning receiver PR has performed the first fix (acquisition) i.e. managed to determine the location of the wireless communication device MS it usually begins to repeat the positioning process (position fixes, tracking) at intervals. For example, the positioning receiver PR determines the location of the device once per second and reports the location data to the control block CTRL of the wireless communication device MS. In the first fix the positioning receiver PR can use information of the center of the serving cell as a default position of the wireless communication device MS. After the first fix the data base is updated by using the newest position reported by the positioning receiver PR. The position value is not used as such but the new position value is used as a parameter of an algorithm which is then calculated. In this example embodiment a recursive algorithm is used as follows.

In the data base DB a covariance matrix C of position values is maintained. The covariance matrix C can be used to determine the range of the cell. The data base DB can contain more covariance matrices if data of more than one cell are acquired and stored in the data base. Let us now assume that there is a set of N recorded position measurements $x_i = [e_i\ n_i\ u_i]^T$ (east north up). The sample mean of the position $\mu_N$ is computed as $$\mu_N = \frac{1}{N}\sum_{i=1}^{N} x_i.$$

The same quantity can also be computed recursively as $$\mu_N = \frac{N-1}{N}\mu_{N-1} + \frac{1}{N}x_N.$$

The mean can be used as the center of the cell and as the default location of the device when the position receiver PR performs the first fix, for example after a situation when there has been a longer period in which the positioning receiver has not been able to perform the positioning (tracking).

As can be seen, the new measurement is weighted by 1/N, where N is the number of updates. As N grows, the significance of the measurement becomes smaller.

In order to estimate the range of the cell, a covariance matrix of the position is needed. The unbiased sample covariance $C_N$ when using the sample mean as an estimate of the expectation $E[x_i]$ is given by $$C_N = \frac{1}{N-1}\sum_{i=1}^{N}(x_i - \mu_N)(x_i - \mu_N)^T.$$

The recursive form for the sample variance is $$C_N = \frac{N-2}{N-1}C_{N-1} + \frac{1}{N^2}(x_N - \mu_{N-1})(x_N - \mu_{N-1})^T + \frac{1}{N-1}(x_N - \mu_N)(x_N - \mu_N)^T$$

There is the same phenomenon in the covariance matrix updating, as can be seen from the equation below $$C_N = \frac{N-2}{N-1}C_{N-1} + \frac{1}{N^2}(x_N - \mu_{N-1})(x_N - \mu_{N-1})^T + \frac{1}{N-1}(x_N - \mu_N)(x_N - \mu_N)^T$$

The cell range estimate is computed from the covariance matrix. Every time the new valid position fix is performed the data base can be updated. However, all the valid position fixes do not have to be stored. Only the number of updates and the current cell parameters such as the current value $C_N$ of the covariance matrix and the cell global identity CGI need to be stored in the data base.

Using the recursive updating method, it is possible to maintain the covariance matrix of the position fixes. Using the covariance matrix, the range of the cell can be given. Within this range a certain fraction of the position fixes exist. For example, the probability limit can be set to 95%, and thus the most erroneous position fixes will not contribute to the reported cell size. In a prior art model all position fixes contributed to the reported cell size and thus, if a position fix was erroneous, it distorted the cell size to be bigger than it really was.

In the following, some further examples of the invention are presented. First, not all the reported positioning data are used in updating the data base. For example, the wireless communication device MS uses more positioning data when the speed of the wireless communication device MS (in horizontal direction) increases. In a non-limiting example embodiment a set of thresholds are defined in the wireless communication device MS for selecting a skipping rate. When the speed of the device is smaller than a first threshold, a first number of position measurements are taken into consideration. When the speed rises above the first threshold, a second number of position measurements are taken into consideration. When the speed further rises above a second threshold, a third number of position measurements are taken into consideration and when the speed is higher than a third threshold a fourth number of position measurements are used in updating the data base. The first number of position measurements means, for example, that every fourth measurement are used or that none of the measurements are used. The second number of position measurements means, for example, that every third measurement are used. The third number of position measurements means, for example, that every other measurement are used. The fourth number of position measurements means, for example, that every measurement is used. It is obvious that the number of thresholds and the skipping rate may differ from the example above.

The alternative that none of the measurements are used may be applied, for example, when the wireless communication device MS is not moving or that the speed is very low, e.g. less than 0.2 m/s.

Figure 5:
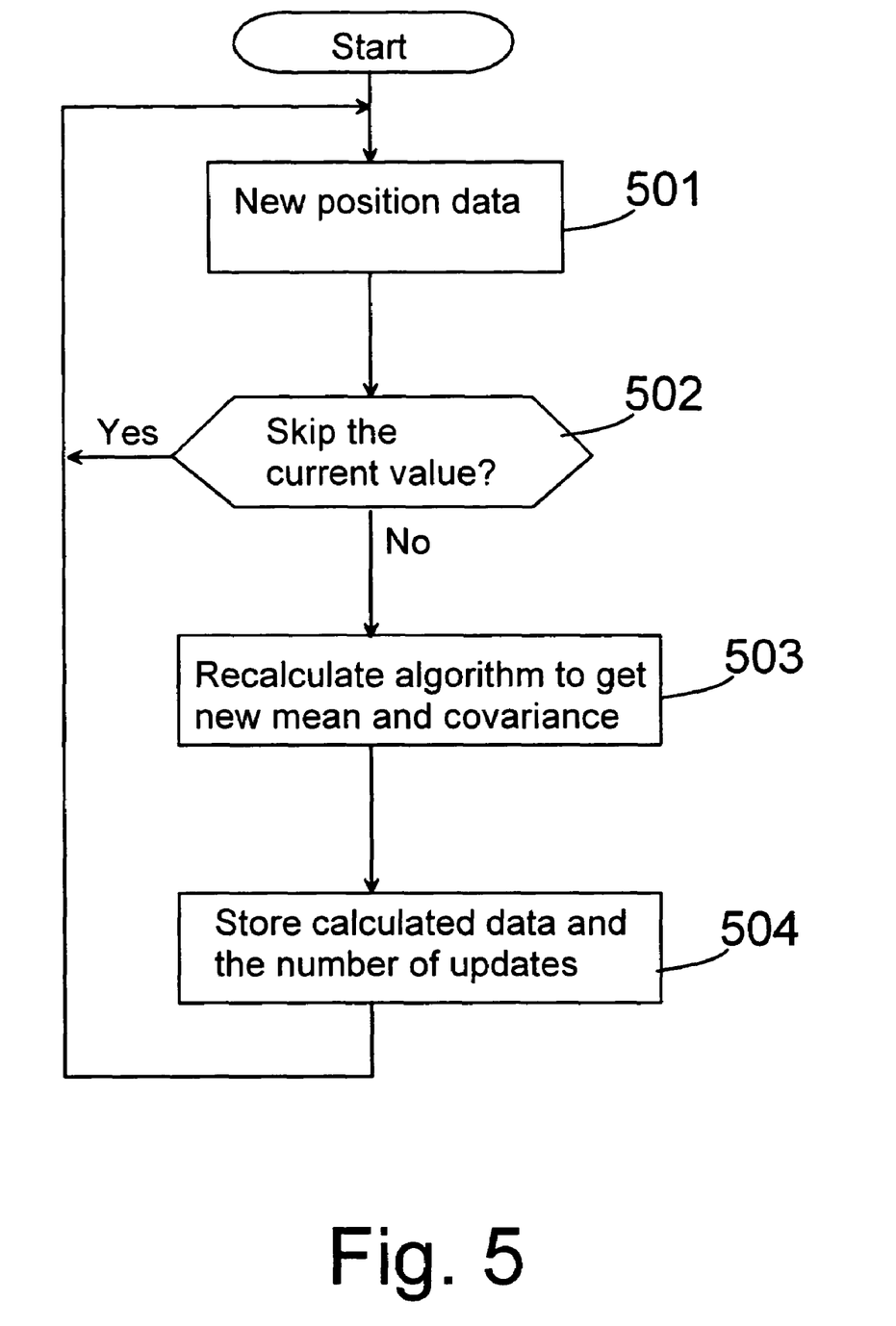
FIG. 5 shows an example embodiment of the method according to the invention in a reduced flow diagram.

In FIG. 5 there is shown an example embodiment of the method according to the invention in a reduced flow diagram. The positioning receiver PR reports a new positioning data e.g. to the control block CTRL of the wireless communication device MS (block 501 in FIG. 5). The control block CTRL determines whether the data base is updated or not (block 502). If it is determined that the data base DB is updated the method continues at block 503 in which the algorithm is recalculated to obtain a new mean value and covariance. The calculated parameters are stored into memory and/or transmitted to the data base server for storing into data base DB (block 504). Then the method continues at step 501 to wait for receiving the next positioning data. If it was determined in block 502 that the data base is not yet updated (the positioning data is skipped) the method continues at step 501.

The speed of the wireless communication device MS can be determined in many different ways. For example, the positioning receiver may calculate the speed and inform it to the wireless communication device. The wireless communication device MS can also calculate the speed by using at least two different positioning data and time interval between the at least two different position data. There can also be a separate device (e.g. a speedometer SP as depicted in FIG. 4) which can measure the speed of the wireless communication device. Still one non-limiting example to be mentioned here is that the user inputs to the wireless communication device some information relating to the speed of the wireless communication device. For example, the user selects from the following alternatives: not moving, walking, bicycling, driving a car slowly, driving a car fast, etc.

In other words, the principle presented above is based on the idea that updating is performed only when necessary. The speed is one criteria to tell whether the updating is necessary or not.

Another option is to weight the updating parameter N by a weighting factor which is determined on the basis of the speed. The bigger the parameter N, the smaller the effect, and thus the weighting could be, e.g. as follows: the weighted parameter N is achieved by dividing the parameter N with the speed; (speed=the velocity in the horizontal level). The weighted parameter can also be calculated by dividing the parameter N with another parameter which is calculated by subtracting a constant value from the speed. Also other functions of the parameter N can be used in calculating the weighted parameter N.

Still another option is that the parameter N is frozen to some predetermined value so that the parameter N does not grow too large. In this embodiment the parameter N may be compared, for example by a comparator CMP implemented in the control block, to a maximum value wherein if the parameter. N is greater than the maximum value the value of the parameter N is not changed.

The updating of the data base DB will usually be a continuous process. However, if the wireless communication device MS determines that the cell global identity CGI changes from a previous one (i.e. the serving cell has changed), the calculation parameters relating to the cell global identity CGI of the current serving cell are retrieved from the data base. If the data base does not contain parameters for the current serving cell the parameters are set to an initial value. For the parameter N the initial value is e.g. 0 which means that no position data is available in the data base DB for the current cell global identity.

The wireless communication device MN can detect the cell change inter alia in connection with a cell handover on the basis of the change in the cell global identity CGI.

As a wireless communication device MS moves from the coverage area of a cell to the coverage area of another cell (e.g. in FIG. 1 from the coverage area of a first base station BS to the range of a second base station BS'), the afore-mentioned detection of the cell data stored in the memory 4, 8 is performed in connection with the handover to detect whether any information on cell(s) of this second base station is stored in the wireless communication device MS, or whether the information should be retrieved from the data base DB. Next, the position of this second base station BS' can be used as the default position of the wireless communication device MS in the positioning of the wireless communication device MS.

On the other hand, because it is known that the wireless communication device MS moved from the coverage area of one cell of the first base station BS to the coverage area of a cell of the second base station BS', it is possible to use at this stage for example some other positioning data calculated on the basis of the cells of these two base stations, for example the midpoint between these two base stations BS, BS', as the default position of the wireless communication device MS. In this case, it is very probable that in connection with a handover the wireless communication device MS is positioned closer to this midpoint than to either of the base stations BS, BS'. In this manner it is possible in some situations to faster achieve the wished positioning precision in the positioning receiver MS.

In some mobile communication systems, such as systems based on the CDMA, the wireless communication device MS can simultaneously communicate with more than one cell. Thus, as the default position of the wireless communication device MS can be used for example the positioning data calculated according to the position of those base stations of the cells that communicate simultaneously with the wireless communication device MS. For example, if cells of three base stations are used in the communication, e.g. the geometric midpoint, which can be used as the default position, it is calculated on the basis of the positioning data of these three base stations. It is obvious that the motion data of the wireless communication device MS can also be used in the definition of the default position, that is, in accordance with the previously performed positionings the direction of movement of the wireless communication device MS is estimated and, on the basis of this, an attempt is made to select the base station positioned close to the direction of movement of the wireless communication device MS, e.g. the wireless communication device is moving towards one of these base stations.

In the above-described method according to the invention it was presumed that the data base DB is located in the mobile communication network, wherein the positioning data can be retrieved from the mobile communication network. The positioning data can also be transmitted enciphered. In this case an enciphering code required in the deciphering is retrieved to the wireless communication device MS from the mobile communication network, for example as point-to-point messages. This kind of messaging is usually subject to a charge to the user of the wireless communication device, wherein the user has to pay for the positioning data of the cells that he/she has retrieved. However, by using the method according to an example embodiment of the invention it is possible to decrease the need to retrieve auxiliary data, because the auxiliary data is stored in the memory 4, 8 of the wireless communication device MS at the stage when new or changed data is received.

Figure 3:
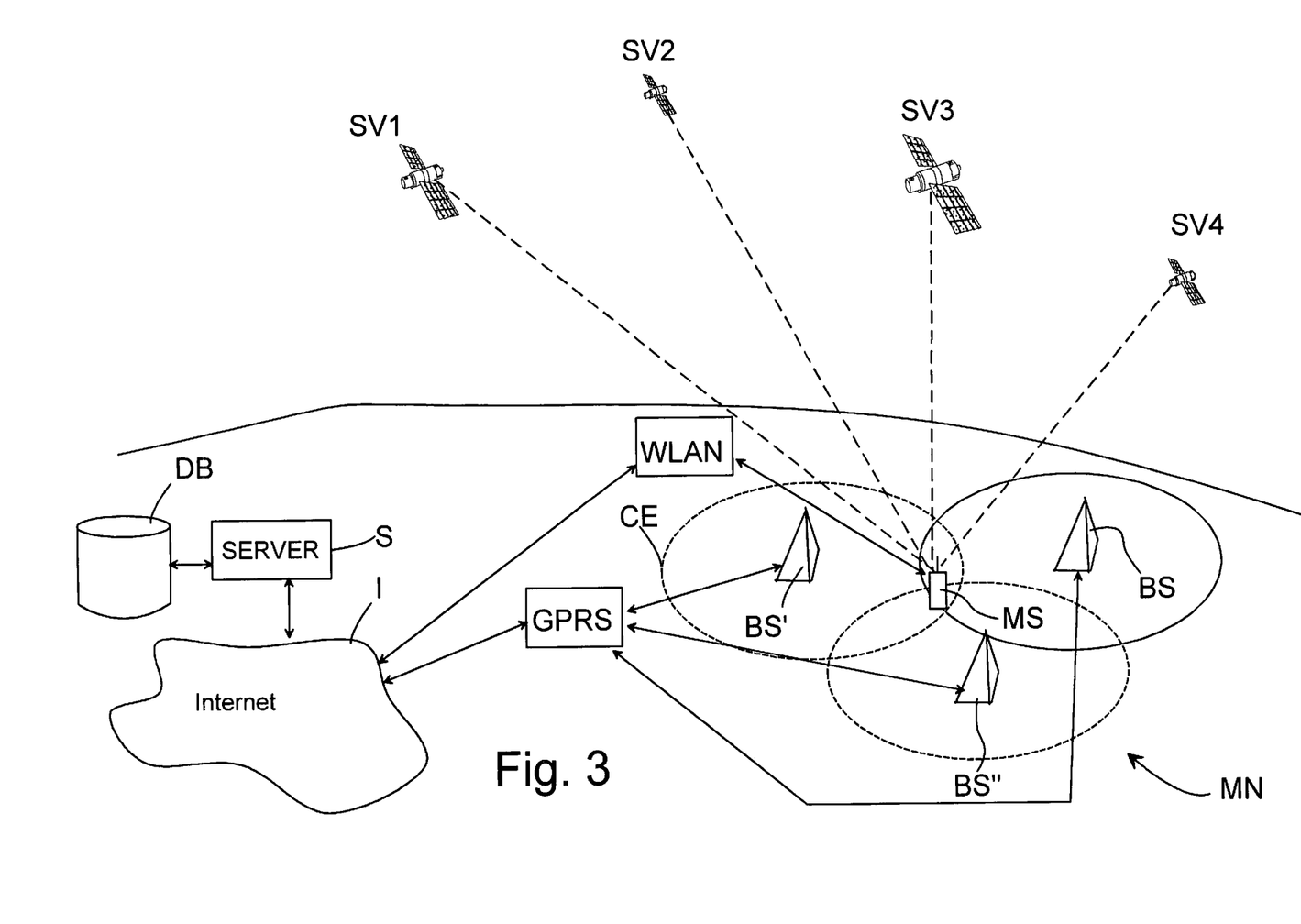
FIG. 3 shows another system applying the method according to a second example embodiment of the invention in a simplified block diagram.

FIG. 3 illustrates, in a reduced chart, a system in which the data base DB is located in an information network or information system which can communicate with the wireless communication device MS. The data base DB is arranged for example in a data base server S that is connected to communicate with the Internet network I. Identification and positioning data of cells are stored in the data base DB. Through the data base server S possibly other auxiliary data of the satellite positioning system can also be downloaded to the wireless communication device MS.

The communication connection set up from the wireless communication device MS can be for example a connection according to a so-called WAP protocol, by means of which the wireless communication device MS can be used for example for browsing information on the Internet network, inter alia www pages of companies and other sites where data is stored. In this case, from the memory 4, 8 of the wireless communication device MS the positioning data of the cell is retrieved, in accordance with which it is possible to communicate with said data base server S that maintains the data base DB for the positioning data of the cells. In addition to this position data the data base identifier CGI of the cell is detected and transmitted for example as messages according to said WAP protocol to the mobile communication network, where the messages are converted for example to messages according to the Internet Protocol and transmitted further to the Internet network in a manner known as such. The identifier of the wireless communication device MS that has transmitted the message is also added to the messages, wherein the response messages can be transmitted back to the communication device that has transmitted the interrogation message. Another example that can be mentioned in this context is the use of short messages (SM) in transmission of positioning data and possible auxiliary data.

Setting up a communication connection with the data base server S can in some situations also be performed for example with a wireless local area network WLAN. Thus, the wireless communication device MS creates a communication connection with a wireless local area network, which is situated in the vicinity of a wireless communication device MS and through which for example the Internet network I can be contacted.

In the Internet network the messages are transmitted to the target address, in this case to the data base server S in which said data base DB is located, by using the message transmission mechanisms of the Internet network, in a manner known as such. The data base server interprets the arrived message and detects, on the basis of the cell global identity CGI of the cell through which the message has been transmitted, the information about this cell and/or base station of the cell from the data base DB. Next, the data base server creates a response message comprising said positioning data, if positioning data related to said cell and/or base station are stored in the data base DB. Subsequently, the response message is transmitted from the data base server S to the Internet network I, where the message is routed to the mobile communication network MN. The mobile communication network transfers the response message to the base station which is communicating with the wireless communication device at the time. The base station sends the response message to the wireless communication device MS. Next, in the wireless communication device MS the received positioning data is stored into the memory 4, 8, and the positioning is performed, if necessary.

In this method according to another example embodiment of the invention the default position of the wireless communication device MS is also defined according to the positioning data of one or a plurality of cells. When the wireless communication device MS moves to the range of a cell, an interrogation message can be transmitted from the wireless communication device requesting the positioning data of said cell to be transmitted to the wireless communication device, in case the positioning data are not yet stored in the wireless communication device MS. This interrogation message is transferred to the data base server S, where it is detected whether the information related to said cell is found in the data base DB. If the data are found in the data base DB, the data are transmitted to the wireless communication device MS. The positioning can thereafter be performed in the positioning receiver PR by using this positioning data of the cell as the default position. In the same context, positioning data of several cells can be transmitted, and for example the data base server S finds out which cells are positioned in the vicinity of said cell, e.g. the adjacent cells. In this case the data base server transmits to the wireless communication device MS also positioning data of these cells positioned close to said cell. This arrangement provides the advantage that when the wireless communication device MS is moving from the range of one cell to the range of another cell the wireless communication device MS already has the positioning data of this another cell.

Even if an existing mobile communication network MN can be utilized in the transfer of the positioning data of the cells in this embodiment, the positioning data are retrieved from outside the mobile communication network MN. The transfer service of such positioning data of the cells can be arranged to be independent of operators. Thus, service providers can themselves price the service and, on the other hand, limit the use of the service if necessary. A service provider can be for example an Internet service provider, that can give to registered users the possibility to retrieve information from the data base DB.

In practice, the data base DB can be decentralized, wherein a plurality of data base servers S can be located in different geographical locations. Thus, when a user arrives close to such a data base server S, a communication connection can be set up between the data base server S and the wireless communication device MS, for example by using a local communication method, such as a so-called Bluetooth or WLAN connection. Through this connection it is possible to transfer for example the positioning data of one or a plurality of reference points of the neighboring area to the wireless communication device MS.

In addition to the positioning data of the cell, the default position of the wireless communication device MS can also in some embodiments be the WLAN access point, the positioning data of which is known and the signals transmitted by which have the necessary information for the identification of the access point. The positioning data of other short-range access points or the like, such as the Bluetooth system, can be applied if the location of these access points is known and the access points can be identified in the wireless communication device MS.

Even if in the above described examples the cell global identity CGI of the base station has been used in the identification of the base station, it is obvious that other identification methods can also be applied. Examples to be mentioned include the country code, which in some cases (for example Monaco) expresses a sufficiently small geographical area in view of the positioning according to the invention. The mobile network code MNC can also in some cases indicate the default position of the wireless communication device MS at a sufficient precision.

The directional pattern of the base station antenna is not necessarily omnidirectional, but it can be directed to some direction. Antenna structures are also known in which the direction of the directional pattern can be changed to a wished direction, for example towards a wireless communication device in order to improve the signal-to-noise ratio in this direction. The directional pattern can also be composed of a plurality of segments directed to different directions. In these kind of situations the default position used is not necessarily the position of the base station, but a point determined according to the directional pattern of the base station, such as the center of the directional pattern. This can in some systems be calculated for example in such a manner that the parameters of the directional pattern are transmitted from the mobile communication network to the wireless communication device, or the calculation is performed in the mobile communication network from which the location obtained as a result of the calculation is transmitted to the wireless communication device.

The wireless communication device MS can determine a so called timing advance data TA which can be used in the data base server S in order to estimate how close to said base station BS, BS', BS" the wireless communication device MS is located. The smaller the advance timing the closer to the base station the wireless communication device is normally located.

By using the above-described method, the positioning can be performed also in poor signaling conditions. Also, no precise time data is required if the position of the reference point is known. Moreover, the transmission of auxiliary data is not dependent on the positioning services provided by the operator.

In a still another embodiment of the present invention the data base DB is provided with map information. For example when the center of the cell is calculated, a map around the center is stored with the cell global identity, hence, when the wireless communication device MS can receive a map of the surroundings of the cell from the data base. It is possible to use the range data in determining the area which should be covered by the map. For example, the map covers the range of the cell or there are smaller maps which together cover the range of the cell. In this latter alternative the wireless communication device MS can send its position data to the data base server which then retrieves the map of that particular area of the cell and sends the retrieved map to the wireless communication device MS. The map may also contain information about some services, buildings, locations etc. located in the area which is covered by the map. The map and the other information can be shown on the display 12 of the wireless communication device MS.

Although the method according to the invention was illustrated above to use and update the data base DB of the serving cell it is also possible that the wireless communication device MS can also receive signals from other, neighboring cells. If the signals contain the cell global identity of the neighboring cell, the wireless communication device MS can use the positioning information to update the data of the neighbor cell in the data base. This kind of situation can arise especially when the wireless communication device MS is far from the serving cell.

The present invention can at least partly be implemented as a software program stored in a readable medium, where the software program comprises machine executable steps for a processor such as the CPU. The calculation operations and also the comparisons can be implemented e.g. in the control block CTRL.

It is obvious that the present invention is not limited solely to the above-presented embodiments, but it can be modified within the scope of the appended claims.

What is claimed is:

1. A method comprising:
   receiving a position of a device;
   receiving identity information of a cell;
   examining a data base to find parameter information relating to the received identity information;
   retrieving from the data base the parameter information; and
   determining whether the data base is to be updated with the position data of the device;
   wherein if it is determined that the data base is to be updated, the method further comprises updating the data base by using the position data of the device,
   wherein the method also comprises using the data base to calculate a default position of the device, then utilizing the default position to search for signals from satellites, and then utilizing said signal from said satellites to calculate a more precise position of the device than the default position, and
   wherein said determining whether the data base is to be updated employs one skipping rate at one speed of the device and employs another skipping rate at an other greater speed of said device,
   wherein said data base is updated less often at said one skipping rate which is greater than said other skipping rate.

2. The method according to claim 1 comprising updating a value of an updating parameter.

3. The method according to claim 1, said determining comprising comparing a magnitude of velocity with a first threshold wherein if the comparison indicates that said magnitude of velocity is lower than said first threshold said one skipping rate is defined, otherwise said other skipping rate is defined.

4. The method according to claim 1 comprising:
   calculating a covariance matrix for the cell indicated by the identity information by calculating a mean value of the position of the device and using the mean value in the calculation of the covariance matrix; and storing the number of updates and the current value of the covariance matrix and the mean value.

5. The method according to claim 4, wherein mean of the position $\mu_N$ is computed as $$\mu_N = \frac{1}{N}\sum_{i=1}^{N} x_i,$$

in which $x_i=[e_i n_i u_i]^T$ is a set of N received positions.

6. The method according to claim 4, wherein the mean of the position $\mu_N$ is computed recursively as $$\mu_N = \frac{N-1}{N}\mu_{N-1} + \frac{1}{N}x_N,$$

in which $x_i=[e_i n_i u_i]^T$ is a set of N received positions and $\mu_{N-1}$ is a previously calculated mean of the position.

7. The method according to claim 4, wherein the covariance matrix is calculated recursively as $$C_N = \frac{N-2}{N-1}C_{N-1} + \frac{1}{N^2}(x_N-\mu_{N-1})(x_N-\mu_{N-1})^T + \frac{1}{N-1}(x_N-\mu_N)(x_N-\mu_N)^T.$$

8. The method according to claim 1 comprising weighting the updating parameter by a weighting factor.

9. The method according to claim 8, wherein the weighting parameter is calculated by one of the following methods:
   dividing the updating parameter by a magnitude of velocity; and
   subtracting a constant value from the magnitude of velocity and dividing the updating parameter by the difference.

10. The method according to claim 1 comprising examining if the updating parameter equals a maximum value wherein the value of the updating parameter is not changed.

11. The method according to claim 1 comprising transmitting said position data of the wireless communication device and said updating parameter to the data base.

12. The method according to claim 11 comprising transmitting said position data of the wireless communication device and said updating parameter to the data base using one of the following:
   WAP protocol; or
   short messages.

13. A module comprising:
   an input configured to receive a position of a device;
   a receiver configured to receive identity information of a cell;
   a control element configured to examine a data base to find parameter information relating to the received identity information; and
   a retriever configured to retrieve the parameter information from the data base;
   wherein the control element is further configured to determine whether the data base is to be updated with the position data of the device; and if it is determined that the data base is to be updated, the control element is adapted to update the data base by using the position data of the device,
   wherein said control element is also configured to employ one skipping rate at one speed of the wireless communication device and to employ another skipping rate at an other greater speed of the wireless communication device, and
   wherein said data base is configured to be updated less often at said one skipping rate which is greater than said other skipping rate.

14. The module according to claim 13 wherein the updating comprises updating a value of an updating parameter.

15. A wireless communication device comprising:
   a positioning receiver configured to define a position of the wireless communication device;
   a receiver configured to receive identity information of a cell;
   a control element configured to examine the data base to find parameter information relating to the received identity information; and
   a retriever configured to retrieve the parameter information from a data base which includes positioning data and identity information of a cell;
   wherein the control element is further configured to determine whether the data base is to be updated with the position data of the wireless communication device; and if it is determined that the data base is to be updated, the control element is configured to update the data base by using the position data of the wireless communication device, and
   wherein said control element is also configured to employ one skipping rate at one speed of the wireless communication device and another skipping rate at an other greater speed of the wireless communication device,
   wherein said data base is configured to be updated less often at said one skipping rate which is greater than said other skipping rate.

16. The wireless communication device according to claim 15 wherein the updating comprises updating a value of an updating parameter.

17. The wireless communication device according to claim 15, wherein said determining comprises comparing a magnitude of velocity with a first threshold, wherein if the comparison indicates that a magnitude of velocity is lower than said first threshold said one skipping rate is defined, otherwise said other skipping rate is defined.

18. The wireless communication device according to claim 15 comprising:
   a calculator for calculating a covariance matrix for the cell indicated by the identity information by calculating a mean value of the position of the device and using the mean value in the calculation of the covariance matrix; and
   a memory for storing the number of updates, the current value of the covariance matrix and the mean value.

19. The wireless communication device according to claim 18, wherein the calculator is adapted to compute the mean of the position $\mu_N$ as $$\mu_N = \frac{1}{N}\sum_{i=1}^{N} x_i,$$

in which $x_i=[e_i n_i u_i]^T$ is a set of N received positions.

20. The wireless communication device according to claim 18, wherein the calculator is adapted to compute the mean of the position $\mu_N$ recursively as $$\mu_N = \frac{N-1}{N}\mu_{N-1} + \frac{1}{N}x_N,$$

in which $x_i=[e_i n_i u_i]^T$ is a set of N received positions and $\mu_{N-1}$ is a previously calculated mean of the position.

21. The wireless communication device according to claim 18, wherein the calculator is adapted to compute the covariance matrix recursively as $$C_N = \frac{N-2}{N-1}C_{N-1} + \frac{1}{N^2}(x_N - \mu_{N-1})(x_N - \mu_{N-1})^T + \frac{1}{N-1}(x_N - \mu_N)(x_N - \mu_N)^T.$$

22. The wireless communication device according to claim 15 comprising a weighting factor for weighting the updating parameter.

23. The wireless communication device according to claim 22, wherein the calculator is adapted to compute the weighting parameter by one of the following methods:
dividing the updating parameter by a magnitude of velocity;
subtracting a constant value from the magnitude of velocity and dividing the updating parameter by the difference.

24. The wireless communication device according to claim 15 comprising a comparator for examining if the updating parameter equals a maximum value wherein the value of the updating parameter is not changed.

25. The wireless communication device according to claim 15 comprising said data base.

26. The wireless communication device according to claim 15 comprising a transmitter for transmitting said position data of the wireless communication device and said updating parameter to the data base which is external to the wireless communication device.

27. A system comprising:
a wireless communication device
a positioning receiver configured to define a position of the wireless communication device;
a receiver in the wireless communication device, configured to receive identity information of a cell;
a control element in the wireless communication device, configured to examine the data base to find parameter information relating to the received identity information; and
a retriever, configured to retrieve the parameter information from a data base which includes positioning data and identity information of a cell;
wherein the control element is further configured to determine whether the data base is to be updated with the position data of the wireless communication device; and if it is determined that the data base is to be updated, the control element is configured to update the data base by using the position data of the wireless communication device,
wherein said control element is also configured to employ one skipping rate at one speed of the wireless communication device and another skipping rate at an other greater speed of said wireless communication device,
wherein said data base is configured to be updated less often at said one skipping rate which is greater than said other skipping rate.

28. The system according to claim 27 wherein the updating comprises updating a value of an updating parameter.

29. The system according to claim 27, wherein said determining comprises comparing a magnitude of velocity with a first threshold, wherein if the comparison indicates that said magnitude of velocity is lower than said first threshold said one skipping rate is defined, otherwise said other skipping rate is defined.

30. The system according to claim 27 comprising:
a calculator for calculating a covariance matrix for the cell indicated by the identity information by calculating a mean value of the position of the device and using the mean value in the calculation of the covariance matrix; and
a memory for storing the number of updates, the current value of the covariance matrix and the mean value.

31. The system according to claim 30, wherein the calculator is adapted to compute the mean of the position $\mu_N$ as $$\mu_N = \frac{1}{N}\sum_{i=1}^{N} x_i,$$

in which $x_i = [e_i, n_i, u_i]^T$ is a set of N received positions.

32. The system according to claim 30, wherein the calculator is adapted to compute the mean of the position $\mu^N$ recursively as $$\mu_N = \frac{N-1}{N}\mu_{N-1} + \frac{1}{N}x_N,$$

in which $x_i = [e_i, n_i, u_i]^T$ is a set of N received positions and $\mu_{N-1}$ is a previously calculated mean of the position.

33. The system according to claim 30, wherein the calculator is adapted to compute the covariance matrix recursively as $$C_N = \frac{N-2}{N-1}C_{N-1} + \frac{1}{N^2}(x_N - \mu_{N-1})(x_N - \mu_{N-1})^T + \frac{1}{N-1}(x_N - \mu_N)(x_N - \mu_N)^T.$$

34. The system according to claim 27 comprising a weighting factor for weighting the updating parameter.

35. The system according to claim 34, wherein the calculator is adapted to compute the weighting parameter by one of the following methods:
dividing the updating parameter by a magnitude of velocity;
subtracting a constant value from the magnitude of velocity and dividing the updating parameter by the difference.

36. The system according to claim 27 comprising a comparator for examining if the updating parameter equals a maximum value wherein the value of the updating parameter is not changed.

37. The system according to claim 27, wherein the data base is decentralized and comprises a plurality of data base servers located in different geographical locations.

38. A computer program product comprising machine executable functions stored in a readable medium for execution on a processor, the machine executable functions comprising:
receiving a position of a device;
receiving identity information of a cell;
examining a data base to find parameter information relating to the received identity information;
retrieving from the data base the parameter information; and
determining whether the data base is to be updated with the position data of the device;
wherein if it is determined that the data base is to be updated the computer program product further comprises machine executable steps for updating the data base by using the position data of the device, and wherein said determining whether the data base is to be updated employs one skipping rate at one speed of the device and an other skipping rate at an other greater speed of the device, and wherein said data base is configured to be updated less often at said one skipping rate which is greater than said other skipping rate.

39. A computer program product according to claim 38 wherein the updating comprises updating a value of an updating parameter.

40. A module or apparatus comprising:
means for receiving a position of a device;
means for receiving identity information of a cell;
means for examining a data base to find parameter information relating to the received identity information; and
means for retrieving the parameter information from the data base;

wherein the means for examining is also for determining whether the data base is to be updated with the position data of the device; and if it is determined that the data base is to be updated, the means for examining is for updating the data base by using the position data of the device, and wherein said means for examining is also for employing one skipping rate at one speed of the wireless communication device and an other skipping rate at another speed of the wireless communication device, wherein said data base is configured to be updated less often at said one skipping rate which is greater than said other skipping rate.

41. The module or apparatus according to claim 40 wherein the updating comprises updating a value of an updating parameter.

* * * * *

UNITED STATES PATENT AND TRADEMARK OFFICE
CERTIFICATE OF CORRECTION

PATENT NO. : 7,440,983 B2
APPLICATION NO. : 11/010063
DATED : October 21, 2008
INVENTOR(S) : Sairo et al.

Page 1 of 1

It is certified that error appears in the above-identified patent and that said Letters Patent is hereby corrected as shown below:

At col. 18, line 14 (claim 31, line 4), please cancel "$x_i = {}_{[ei} n_i u_i]^T$" and substitute --$x_i = [e_i n_i u_i]^T$-- therefor; and at col. 18, line 16 (claim 32, line 2), please cancel "$\mu^N$" and substitute --$\mu_N$-- therefor.

Signed and Sealed this

Sixth Day of January, 2009

JON W. DUDAS
*Director of the United States Patent and Trademark Office*